UNITED STATES PATENT OFFICE.

IRA T. CURTIS AND J. WILLARD SMITH, OF ROCHESTER, NEW YORK.

IMPROVEMENT IN PREPARATION OF WHEAT FOR FOOD.

Specification forming part of Letters Patent No. 116,691, dated July 4, 1871.

*To all whom it may concern:*

Be it known that we, IRA T. CURTIS and J. WILLARD SMITH, both of the city of Rochester, in the county of Monroe and State of New York, have invented a certain new and Improved Preparation of Wheat for Food; and we do hereby declare that the following is a full and exact description thereof:

Our invention consists in producing crushed wheat as an article of food without grinding. To produce the effect above described we provide a machine consisting of two adjustable rollers so arranged that the wheat which is fed down from a hopper or spout above will pass through and be simply crushed without receiving any attrition or wearing friction. The object of the adjustment is to set the rollers to crush finer or coarser, as may be desired. By this action the interior of the kernel is thoroughly broken up and its atoms disintegrated.

The crushed product in itself, without grinding, forms a very palatable food by simply boiling, or making into a pudding, and serving with proper dressing. It is found of much benefit to persons of sedentary habits and predisposed to costiveness, as it digests easily and keeps the bowels relaxed.

We are aware that it is common to produce what is known as "cracked wheat" by passing the grain between coarse stones for the purpose of simply breaking it. Such is not the equivalent of our invention, as the grain is not crushed, but simply broken.

We do not claim the crushing of the wheat preparatory to grinding; but

What we claim, and desire to secure by Letters Patent, is—

As a new article of food, crushed wheat, prepared by being passed through rollers, substantially as herein described.

In witness whereof we have hereunto signed our names in the presence of two subscribing witnesses.

IRA T. CURTIS.
J. WILLARD SMITH.

Witnesses:
R. F. OSGOOD,
GEO. W. MIATT.